Aug. 13, 1968     H. B. TRUSSELL     3,396,702
POULTRY GROWING PROCESS AND APPARATUS
Filed Aug. 17, 1965     2 Sheets-Sheet 1
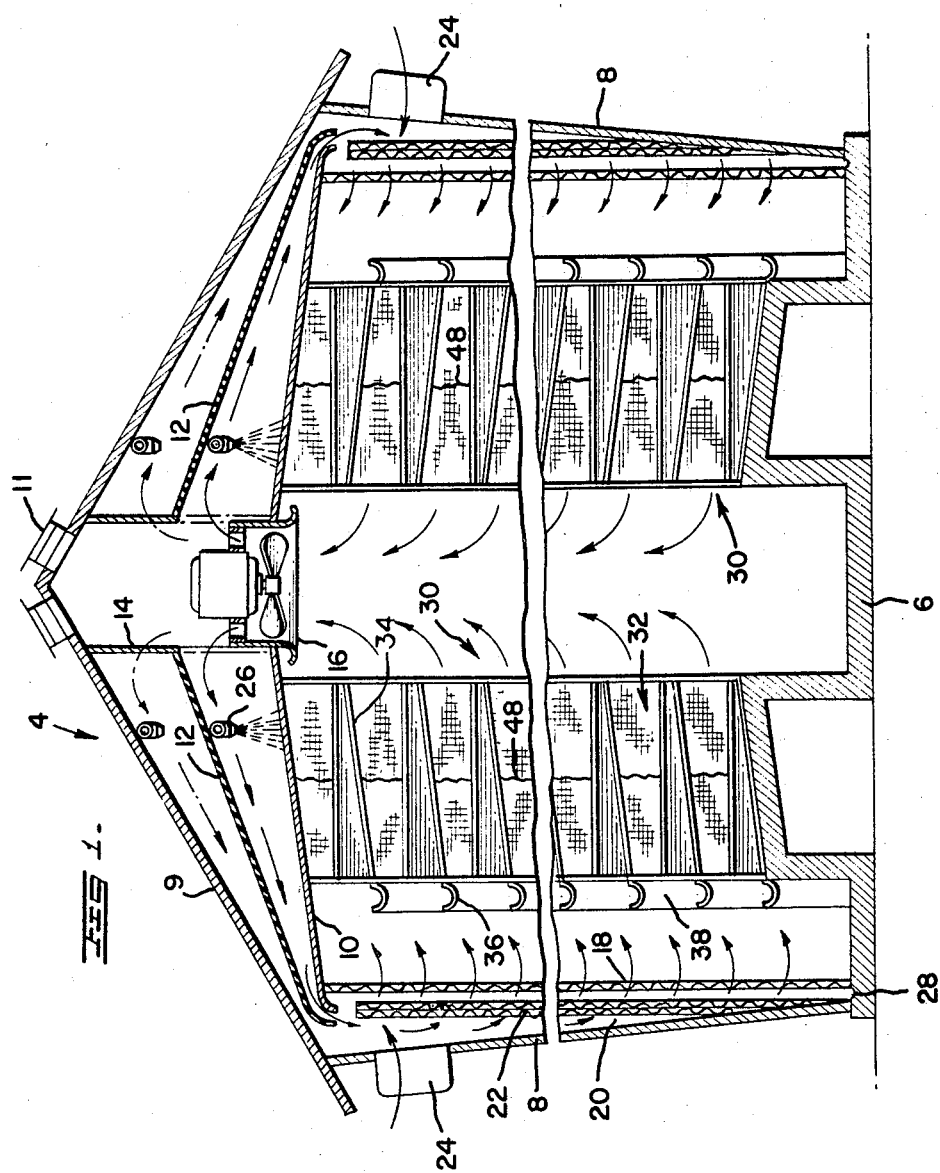
INVENTOR
HARRY B. TRUSSELL
BY
ATTORNEYS

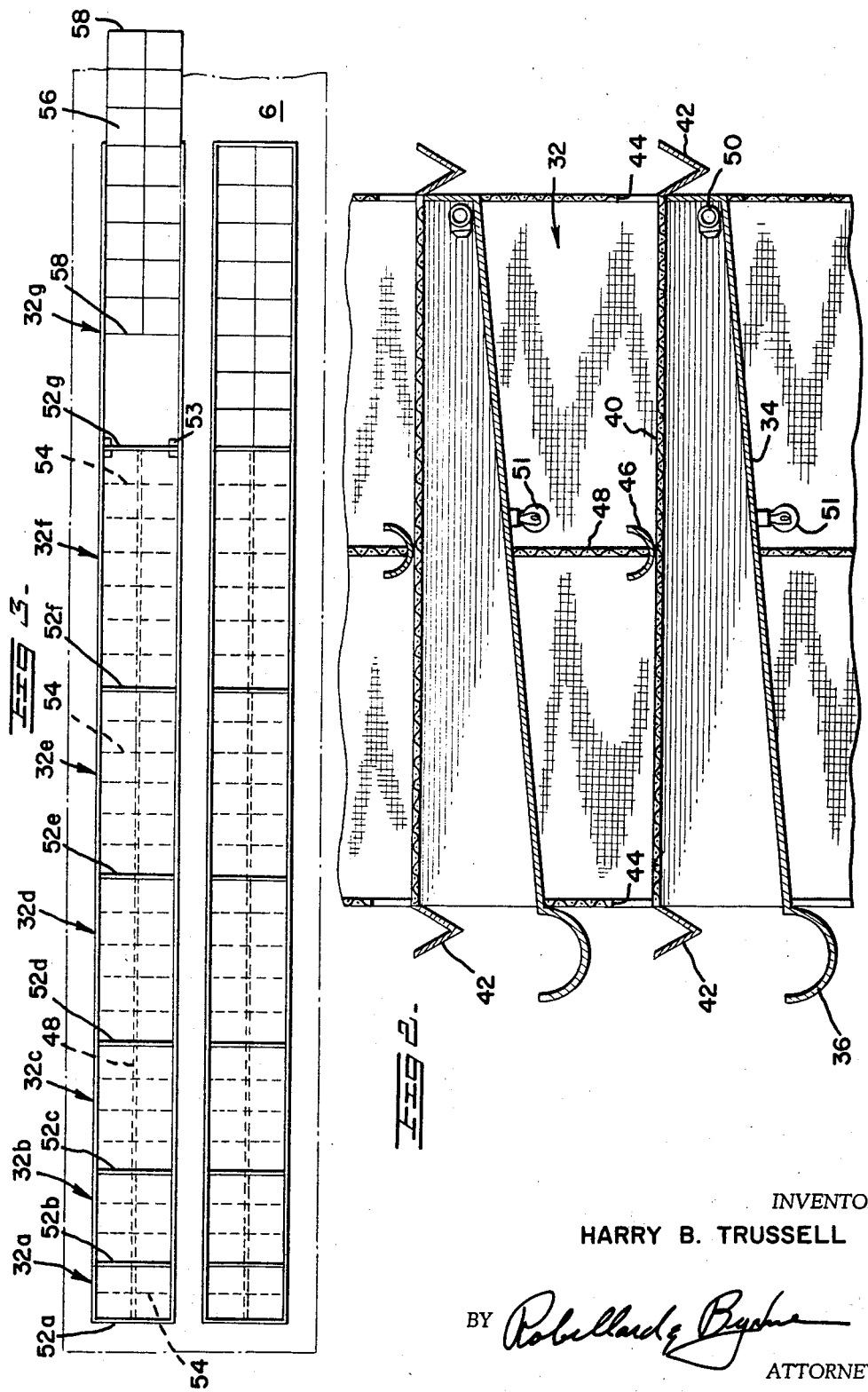

United States Patent Office 3,396,702
Patented Aug. 13, 1968

3,396,702
POULTRY GROWING PROCESS AND APPARATUS
Harry B. Trussell, 609 Stokeswood Ave. SE.,
Atlanta, Ga. 30316
Filed Aug. 17, 1965, Ser. No. 480,373
5 Claims. (Cl. 119—17)

ABSTRACT OF THE DISCLOSURE

An apparatus for growing livestock comprising an elongated enclosed unit having a plurality of transversely disposed imperforate doors dividing the unit into longitudinally aligned enclosures of increasing size from one end of the unit to the other end with a plurality of removable cages located within the enclosure at the other end of the unit and with the imperforate doors being openable to provide access between one enclosure and the succeeding enclosure thereto.

---

This invention relates generally to growing of livestock and particularly to an improved process and apparatus for high-density, mass production growing of poultry.

Although the precepts of this invention are specifically applied to the growing of poultry, it should be understood that the apparatus and process taught herein can be applied to other type stock with minor modifications thereto.

In prior art poultry raising, it is common to place young chicks in buildings and "floor" raise them in batches thereby producing flocks of grown chickens every two or three months. Recently, high-density, high-production techniques have been investigated for growing more birds in less space with a maximum efficiency and utilization of equipment.

A major problem which is encountered with attempts to grow poultry in high-density, confined conditions is that of rapid spread of disease through highly compacted flocks of birds. Sources of and vehicles for transmission of disease through flocks are dirt, feather dust, air-borne germs and droppings from infected chickens. In a highly compact flock, obviously these factors can cause epidemics which can quickly infect the entire flock.

Other attempts have been made in recent art to increase the efficiency of utilization of buildings by periodically moving generations of birds from room to room, the rooms increasing in size in accordance with the increase in size corresponding to the growth of the birds during the periods corresponding to the movement. Serious problems have been encountered in this approach to chicken growth in that diseases may be transmitted not only among birds of a flock but between birds of succeeding generations.

Another difficulty involved in high density growing poultry is that the rate of cannibalism is directly dependent upon the comfort of the birds in that the higher degree of comfort provided by the environment in which the birds are growing, the lower the inclination for cannibalism will be in the birds. With a reduction in the inclination towards cannibalism the necessity for debeaking of chicks with the attendant shock, mortality rate and effect on the quality and quantity of the meat output will be eliminated.

The level of comfort of the growing birds also plays an important factor in the ultimate quality and quantity of the meat produced in the birds. Application of present art methods of environmental control to the high-density, high-production process of growing poultry is ineffective in that the quality and quantity of meat produced is reduced due to the inevitable reduction in comfort caused by crowding conditions.

It is therefore an object of this invention to provide method and apparatus for raising poultry under high-density conditions which eliminate the disadvantages of the prior art.

It is another object of this invention to provide an apparatus for growing poultry with a maximum utilization of space by providing tiered poultry growing units in multi-deck towers so that several flocks of birds may be raised in superimposed relation to one another.

It is a further object of this invention to provide an apparatus for growing poultry which will produce meat at a lower cost per pound by maximum high-density utilization of space and equipment.

It is still another object of this invention to provide an apparatus for growing poultry in which it is possible to mass produce a more uniform size and quality of product by providing maximum climatic and environment control for the growing bird.

It is still a further object of this invention to provide an apparatus for growing poultry which produces a high-grade quality of finished poultry by furnishing means to provide optimum comfort and environmental control throughout the entire growth cycle.

It is still another object of this invention to provide an apparatus for high-density growing of poultry which minimizes the incident and spread of disease throughout the flock by environmental control and by maximum segregation of flocks as well as segments of flocks.

It is still another object of this invention to provide method and apparatus for high-density growing of high quality poultry by furnishing means to effect the flow of poultry through the apparatus without handling, forcing or shocking.

It is yet another object of this invention to provide method and apparatus for high-density, low-cost growing of poultry by furnishing means to restrain, support, feed, water and ventilate the poultry with a minimum expenditure of manpower.

It is yet another object of this invention to provide an apparatus for high density growing of poultry with the minimum amount of possibility of incident of spread of disease by furnishing means to remove fecal waste without the use of mechanical movement to keep the growing area clean, odorless and sanitary.

It is still another object of this invention to provide process and apparatus for producing poultry in any climatic area under all weather conditions by furnishing enclosed buildings having independent climatic control apparatus.

It is yet a further object of this invention to provide an apparatus for high-density production of poultry which will produce finished poultry on a continuous weekly basis.

It is still another object of this invention to provide an apparatus for growing poultry in which they may be closely integrated with breeding, hatching and feeding facilities.

It is still a further object of this invention to provide an apparatus for producing poultry which will permit outloading with the minimum of effort by furnishing means to remove a portion of the apparatus at the terminal end thereof thereby eliminating handling, shock and injury and subsequent downgrading of the birds.

These and other objects will become more apparent to those skilled in the art by reference to the following detailed description when viewed in light of the accompanying drawings wherein like numerals indicate like parts thereof and wherein:

FIGURE 1 is an end elevational view of a building incorporating features in accordance with the invention showing the arrangement of growing units and environmental control therein;

FIGURE 2 is an enlarged elevational sectional view of a portion of the growing units of FIGURE 1; and FIGURE 3 is a reduced plan schematic view showing the arrangement of the growing units in accordance with the invention.

Turning now to FIGURE 1 of the drawings, a growing house shown generally at 4, is made up of a floor 6, side walls 8 and a pitched roof 9. A ceiling 10 is suspended beneath the roof 9 and and insulating baffle 12 divides the space from between the roof 9 and ceiling 10 for purposes to be described later. Doors 14 are disposed in an abutting relationship to the inner end of the baffle 12 and are slidable between positions covering the entrance to the chamber below the baffle 12, as indicated by phantom lines, or the entrance to the chamber above the baffle 12. A horizontally disposed fan assembly 16 is located in the center of the ceiling 10 and serves to circulate air through the house 4. Vertically disposed porous or pervious curtains 18 depend from the ceiling 10 and serve, together with the walls 8 of the building, to form a plenum chamber 20 on either side of the building. A vertically disposed evaporative cooler 22 is located beneath the outer edge of ceiling 10 and extends downwardly to intersect the wall 8. A fresh air inlet and purification apparatus 24 is located on the wall 8 beneath the eaves formed by the roof 9. Although these devices are shown disposed on the outer surface of the wall 8, and they may be located internally of the building if so desired.

A pair of growing towers 30 are mounted in spaced relation on the floor 6 and extend upwardly to the ceiling 10 forming service aisles on either side thereof. Each tower 30 comprises a plurality of tiered growing units 32 each of which are provided with sloped surfaces 34 at the bottom thereof, the sloped surfaces terminating in waste trough 36. The waste trough 36 in turn communicates with a vertically disposed waste collecting manifold 38 at one of the ends thereof.

Turning now to FIGURE 2 of the drawings, a portion of the growing tower 30 showing growing units 32 in enlarged detail is shown in section. A horizontally disposed mesh floor 40 disposed above the sloped surface 34 forms the floor of each of the growing units 32. Feed troughs 42 are disposed on either edge of the floor 40, access being provided thereto through openings 44 in the side walls of the unit. A longitudinally disposed central water trough 46 is located on the floor 40 and is bisected by a vertical mesh wall 48 dividing the unit in half. A water spray manifold 50 is located proximate the upper edge of the sloped surfaces 34 to provide for flushing of waste collected thereon. A series of lights 51 are provided in each enclosure 32 to provide illumination in the apparatus as required.

Referring now to FIGURE 3 of the drawings, a schematic plan view of the entire growing unit is illustrated. Each of the growing units 32 are divided by vertically sliding imperforate doors 52a through 52g into subunits 32a through 32g. Each of the subunits is further divided into equal segments by an appropriate number of vertically sliding secondary doors 54 transversely disposed across the subunits 32a through 32f while the subunit 32g is divided into equal segments by a plurality of individual cages 56. The transverse walls 58 of each of the cages 56 are formed as vertically sliding doors for purposes to be described below. The sliding capability for the above-mentioned doors may be provided in any suitable manner. As shown diagrammatically at 52g in FIGURE 3, rails 53, disposed on either side of the door 52g slidably retain the door so that an upward pull thereon will result in the door being raised.

In operation, the environmental control functions around the air circulating fan assemblies 16. Since the heat output of a flock of birds is always greater than that required to maintain a desired level of temperature in an enclosed house, some provision must be made for cooling the house regardless of ambient climatic conditions. Exhaust air is withdrawn from the towers 30 through the fan 16 and is then processed for recycling through the towers.

If the ambient temperature conditions are lower than those desired in the house, the doors 14 are lowered, either manually or through any automatic thermostatic control means, to block air flow through the passage beneath the baffle 12 so that air flows through the passage above the baffle. With this circulation, the roof then serves as a heat transfer surface to transmit heat from the exhaust air to the colder ambient air thereby providing a pre-cooling for air from the tower area. If, on the other hand, the ambient temperature is higher than that desired in the house, then the doors 14 are raised to position shown by solid lines in FIGURES 1, closing the passages above the baffles and opening the passages below the baffles 12 to permit airflow therethrough. Depending upon the position of the doors 14, the proper water spray rack 26 is activated to provide a curtain of water for both cooling and filtering the air passing therethrough. The water from the spray rack 26 then runs down the sloping ceiling 10 on the evaporative cooler 22. The evaporative coolers are formed of a series of vertically disposed pervious curtains which absorb water flowing thereon from the ceiling 10 and transmit it therethrough by capillary action. Ambient air suitable filtered and sterilized, is admitted through the fresh air inlets 24 to be mixed with the stream of air flowing downwardly from the appropriate channel and into the plenum 20. The screen 18 is of such a character that the airflow passing therethrough undergoes a pressure drop across the screen so that a pressure head is built up within the plenum. The walls 8 are canted at such an angle to vertical that the decrease in cross sectional area of the plenum is essentially proportional to the loss in volume of air through the screen in downwardly progressing increments occurs. This provides a constant pressure head so that the velocity and volume of airflow into the tower area is substantially constant throughout the vertical length of the screen 18. Means are also provided to filter the air passing through the evaporative cooler 22 to remove any traces of feather dust or other disease-carrying matter from the flow. In this manner the air entering the tower area is completely cleaned and reconditioned prior to passage through the towers 30. By proper regulation of the amount of spray, the velocity of the air, and the amount of fresh air into the circulating system, the temperature, humidity, velocity, and cleanliness of the air can be regulated to a high degree and by cleaning the air, the transmission of disease through airborne feather dust, dirt and other materials is eliminated.

By automatic or manually controlled flushing of the sloping surface 38 the bird droppings are enrobed and removed at any desired interval so that diseases resulting from accumulation and putrification of droppings as well as the odors caused thereby are kept at a minimum. Through the combination of the recycling and cleaning of the air and the constant removal of the droppings, most of the disease spreading and/or causing factors are minimized while comfort conditions are maintained at as high a level as possible. Assuming that the growing towers are empty and production is to be initiated, the apparatus is operated as follows: Door 52a and the door 54 in the growing unit 32a are raised to prepare the unit 32a for reception of day-old chicks from the hatchery. The lights 51 are turned on in each of the units 32a and feed and water are supplied to the troughs 42 and 46 respectively. The fan apparatus 16 is then started to provide proper circulation of air through the units and day-old chicks are moved into the unit 32a at a density of approximately 12.5 chicks per square foot whereupon the door 52a is lowered. After the chicks have had an opportunity to disperse themselves uniformly over the floor of the unit 32a, the secondary door 54 of that unit is lowered thereby, in conjunction with the vertical wall 48, dividing the flock into four substantially equal segments.

In operation of the individual units, feed and water are supplied during the growing cycle to the troughs 42 and 46 respectively, preferably from some central source. Droppings accumulate on the sloping surface 34 and are periodically flushed therefrom by actuation of the water spray 50 for transmission through the waste trough 36 to a central collection point.

At the end of one week, the doors 52b and doors 54 in the units 32a and 32b are raised while the lights 51 are turned on in unit 32b and off in 32a to encourage the flock to migrate into unit 32b. Spray means (not shown) are then transversely applied to the mesh floor 40 of the units 32a moving first longitudinally proximate the door 52a to the door 52b to clean the waste, feather dust and other debris from the unit 32a as well as to clear the unit 32a of straggling birds, and then return in reverse to door 52a to complete cleaning of that unit. Door 52b is then lowered and the week-old flock is allowed to distribute itself substantially uniformly throughout the enclosure 32b whereupon the secondary doors 54 of that enclosure are lowered to, in combination with the vertical wall 48, divide the flock into six equal segments. A new flock of day-old chicks is then placed in the unit 32a.

The above cycle is repeated at weekly intervals until the first flock, now at six weeks of age, enters the unit 32g. As was described above, the unit 32g is provided with removable cages 56 having vertically sliding walls 58 on the transverse sides thereof. When inserted in the unit, these cages have an appearance and operate in the same manner as the chambers formed by the sliding doors 54 and vertical wall 48 of the preceding units. At the end of the seventh week, the cages 56 are removed from the chamber 32g and are loaded for shipment to a processing plant. After cleaning of the unit 32g in a manner similar to that described above for unit 32a, a new set of cages 56 are inserted therein and the cycle is continued. As can be seen by reference to FIGURE 3, each succeeding unit is both greater in size and is provided with one more secondary sliding door 54 than the preceding unit thereto so that, not only are the birds provided with increased area in each weekly cycle, but they are separated into a larger number of segments within the unit as they increase in age. The change in unit size between units is furnished to provide increased floor space per bird according to the projected growth of that bird during the cycle. Although the ratio in size between the units may be varied to a certain degree, the increase in size should preferably be sufficient to provide at least the amount of floor space per bird according to the following table:

| Age, weeks | Area per bird, square feet | Average weight, lbs. |
|---|---|---|
| 0 | .08 | .10 |
| 1 | .12 | .25 |
| 2 | .18 | .56 |
| 3 | .30 | .93 |
| 4 | .40 | 1.30 |
| 5 | .50 | 1.93 |
| 6 | .60 | 2.60 |
| 7 | .70 | 3.25 |
| 8 | .80 | 3.85 |
| 9 | .88 | 4.60 |
| 10 | 1.00 | 5.40 |
| 11 | 1.15 | 6.40 |
| 12 | 1.25 | 7.50 |
| 13 | 1.35 | 8.50 |

Because of the problems of disease control discussed above, it is also important that movement of the birds among the flock be kept to a minimum. This is accomplished by providing the increased division of the flock furnished by the sliding doors 54 so that the birds are restricted in movement within the area defined by each subunit formed by the doors. As was stated above, the doors 52 are imperforate to prevent transmission of disease between generations of the birds and, although the doors 54 have been indicated as mesh, these may also be imperforate, if desired, to reduce possibility of transmission of disease between segments of the flock in a given generation. The vertical wall 48 as well as the longitudinal outer walls of the unit must, however, be perforate to provide for air circulation from the cooler 22 to the fan assembly 16.

Although the towers shown in FIGURE 3 indicate a seven-week growing cycle, it should be obvious that units can be added, in accordance with the above table, to produce birds at any desired age.

As has been indicated, the above set forth table is exemplary of a preferred space-per-bird arrangement. The ideal space, however, will depend on the size of the entire unit and the total bird output intended. For example, in a million bird-per-year unit, the following space arrangement is preferred:

| Enclosure number | Age of bird, weeks | Area per bird, sq. ft. |
|---|---|---|
| 1 | 0 | .10 |
| 2 | 1 | .15 |
| 3 | 2 | .25 |
| 4 | 3 | .35 |
| 5 | 4 | .45 |
| 6 | 5 | .55 |
| 7 | 6 | .65 |
| 8 | 7 | .75 |
| 9 | 8 | .85 |
| 10 | 9 | .95 |
| 11 | 10 | 1.05 |
| 12 | 11 | 1.15 |
| 13 | 12 | 1.25 |

What has been set forth above is intended as exemplary of an embodiment in accordance with the invention to enable those skilled in the art in the practice thereof and it should therefore be understood that, within the scope of the appended claims, the invention may be practiced other than as specifically described.

What is new and desired to be protected by Letters Patent of the United States is:

1. An apparatus for growing livestock comprising:
an elongated enclosed unit;
a plurality of transversely disposed imperforate doors dividing said unit into longitudinally aligned enclosures of increasing size from one end of said unit to the other, said imperforate doors being openable to provide access between one enclosure and the succeeding enclosure thereto;
a plurality of perforate doors transversely disposed in said enclosures to divide them into subenclosures, and removable cage means adjacent the last formed enclosure at the other end of said unit for receiving said livestock when the imperforate door of said last formed enclosure at the other end is opened.

2. An apparatus for growing poultry comprising:
an elongated enclosed unit, at least the longitudinal walls of said units being air pervious;
a perforate floor in said unit, a sloping surface disposed subjacent said floor and extending coextensive therewith, means to periodically sweep said surface with liquid, and means to collect the effluent from said surface;
means to circulate cool sterilized air transversely through said unit;
a plurality of transversely disposed imperforate doors dividing said unit into longitudinally aligned enclosures increasing in size from one end of said unit to the other, said imperforate doors being openable to provide access between one enclosure and the succeeding enclosure thereto;
a plurality of removable cages located adjacent the last formed enclosure at the other end of said unit;
and openable perforate doors transversely disposed in each of said enclosures to divide said enclosures into subenclosures.

3. An apparatus for growing poultry comprising:
an elongated enclosed unit;
a plurality of transversely disposed imperforate doors dividing said unit into longitudinally aligned enclosures increasing in size from one end of said unit to the other, said imperforate doors being openable to provide access between one enclosure and the succeeding enclosure thereto, removable cage means adjacent the last formed enclosure at the other end of said unit for receiving said livestock when the imperforate door of said last formed enclosure at the other end is opened, the increase in size between enclosures being sufficient to furnish an increase in floor space per bird transferred between enclosures to a bird weight per unit area substantially according to the following table:

| Enclosure number | Age of bird, weeks | Weight per unit area, lbs./ft.$^2$ |
| --- | --- | --- |
| 1 | 0 | 1.2 |
| 2 | 1 | 2.0 |
| 3 | 2 | 3.1 |
| 4 | 3 | 3.1 |
| 5 | 4 | 3.2 |
| 6 | 5 | 3.9 |
| 7 | 6 | 4.3 |
| 8 | 7 | 4.7 |
| 9 | 8 | 4.8 |
| 10 | 9 | 5.2 |
| 11 | 10 | 5.4 |
| 12 | 11 | 5.6 |
| 13 | 12 | 5.8 |
| 14 | 13 | 5.7 |

4. An apparatus for growing poultry comprising:

an elongated enclosed unit;

a plurality of transversely disposed imperforate doors dividing said unit into longitudinally aligned enclosures increasing in size from one end of said unit to the other, said imperforate doors being openable to provide access between one enclosure and the succeeding enclosure thereto, removable cage means adjacent the last formed enclosure at the other end of said unit for receiving said livestock when the imperforate door of the last formed enclosure at the other end is opened, the increase in size between enclosures being sufficient to furnish an increase in floor space between enclosures per bird substantially according to the following table:

| Enclosure number | Age of bird, weeks | Area per bird, sq. ft. |
| --- | --- | --- |
| 1 | 0 | .10 |
| 2 | 1 | .15 |
| 3 | 2 | .25 |
| 4 | 3 | .35 |
| 5 | 4 | .45 |
| 6 | 5 | .55 |
| 7 | 6 | .65 |
| 8 | 7 | .75 |
| 9 | 8 | .85 |
| 10 | 9 | .95 |
| 11 | 10 | 1.05 |
| 12 | 11 | 1.15 |
| 13 | 12 | 1.25 |

5. An apparatus for high production growing of poultry comprising:

a building having a floor, walls and ceiling thereto;

a plurality of growing towers arranged in said building, said towers including a plurality stacked, superimposed elongated units, at least the longitudinal wall of said units being air pervious, each of said units comprising a perforate floor, a sloping surface disposed subjacent to said floor and extending coextensively therewith, means to periodically sweep said surface with a liquid, and means to collect the effluent from said surface, a plurality of transversely disposed imperforate doors dividing said unit into longitudinally aligned enclosures increasing in size from one end of said unit to the other, said imperforate doors being openable to provide access between one enclosure and the succeeding enclosure thereto, a plurality of removable cages located adjacent the last formed enclosure at the other end of said unit, and openable perforate doors transversely disposed in each of said enclosures to divide said enclosures into subenclosures;

and means including a fan and duct system for transversely circulating purified and cooled air evenly through said towers.

References Cited

UNITED STATES PATENTS

| 2,061,712 | 11/1936 | Martin | 119—31 |
| 2,250,818 | 7/1941 | Sperry | 119—22 |
| 2,257,734 | 10/1941 | Cornell | 119—21 |
| 2,701,547 | 2/1955 | Shaw | 119—22 |
| 2,702,503 | 2/1955 | Wildhaber | 119—30 |
| 2,881,733 | 4/1959 | Young et al. | 119—15 |

FOREIGN PATENTS

| 801,139 | 9/1958 | Great Britain. |
| 954,314 | 4/1964 | Great Britain. |

HUGH R. CHAMBLEE, *Primary Examiner.*